(12) United States Patent
Meng

(10) Patent No.: US 11,400,670 B2
(45) Date of Patent: Aug. 2, 2022

(54) AUTOMATIC POURING DEVICE AND POURING METHOD FOR LENS MONOMER

(71) Applicant: TOPLENS HANGZHOU INC., Zejiang (CN)

(72) Inventor: Hongxiang Meng, Hangzhou (CN)

(73) Assignee: TOPLENS HANGZHOU INC., Hangzhou (CN)

( * ) Notice: Subject to any disclaimer, the term of this patent is extended or adjusted under 35 U.S.C. 154(b) by 304 days.

(21) Appl. No.: 16/620,519

(22) PCT Filed: Jun. 12, 2018

(86) PCT No.: PCT/CN2018/090862
§ 371 (c)(1),
(2) Date: Dec. 8, 2019

(87) PCT Pub. No.: WO2018/228385
PCT Pub. Date: Dec. 20, 2018

(65) Prior Publication Data
US 2021/0078270 A1    Mar. 18, 2021

(30) Foreign Application Priority Data
Jun. 13, 2017   (CN) .......................... 201710444340.7

(51) Int. Cl.
*B29D 11/00* (2006.01)
*B29C 39/44* (2006.01)
*B29K 105/00* (2006.01)

(52) U.S. Cl.
CPC ........ *B29D 11/00951* (2013.01); *B29C 39/44* (2013.01); *B29K 2105/0002* (2013.01)

(58) Field of Classification Search
CPC .......................... B29D 11/00951; B29C 39/44
See application file for complete search history.

(56) References Cited

U.S. PATENT DOCUMENTS 4,019,562 A * 4/1977 Shiraiwa .............. B22D 11/186
164/155.3

FOREIGN PATENT DOCUMENTS

JP       2002-18866     *  1/2002

* cited by examiner

*Primary Examiner* — Mathieu D Vargot
(74) *Attorney, Agent, or Firm* — George Guosheng Wang; United States Research and Patent Firm

(57) ABSTRACT

The present invention provides an automatic casting device for a lens monomer and a process thereof. When the lens monomer within a mold cavity reaches a liquid level monitoring point P, the cavity is exactly 50% filled with the lens monomer. The remaining of the casting process will be precisely controlled based on the obtained data from the past process to ensure an exact 100% monomer filling into the cavity.

13 Claims, 6 Drawing Sheets

AUTOMATIC POURING DEVICE AND POURING METHOD FOR LENS MONOMER

CROSS-REFERENCE TO RELATED APPLICATIONS

This application is a continuation (CIP) of, and claims priority to, international Application No. PCT/CN2018/090862, filed on Jun. 12, 2018, which claims the benefit of Chinese Patent Application App. No. 201710444340.7, filed on Jun. 13, 2017. The entire contents of the foregoing are incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to an automatic device and process for precise pouring, filling or casting an uncured liquid/viscous material or resin into a molding cavity. Although the invention will be illustrated, explained and exemplified by casting of lens monomers, it should be appreciated that the present invention can also be applied to the casting of other materials for manufacturing other products that needs a precise control of material feeding. In various embodiments, the present invention utilizes light spot displacement and/or light intensity variation after a light beam passes through the mold cavity to detect whether the cavity is partially filled (e.g. exactly 50% filled). The remaining of the casting process will be precisely controlled based on the obtained data from the past process.

BACKGROUND OF THE INVENTION

Currently, there are more and more people wearing glasses, because of myopia caused by eye fatigue, and diopter in middle-aged and elderly people. Glasses, also known as eyeglasses or spectacles, are visual aids, consisting of glass or hard plastic lenses mounted in a frame that holds them in front of a person's eyes, typically using a bridge over the nose and arms which rest over the ears.

Corrective lenses can be produced in many different shapes from a circular lens called a lens blank. Lens blanks are cut to fit the shape of the frame that will hold them. Frame styles vary and fashion trends change over time, resulting in a multitude of lens shapes. For lower power lenses, there are few restrictions which allow for many trendy and fashionable shapes. Higher power lenses can cause distortion of peripheral vision and may become thick and heavy if a large lens shape is used. However, if the lens becomes too small, the field of view can be drastically reduced.

As the demand for ophthalmic lenses used for protecting vision has been dramatically increased. For the vast majority of spectacle lenses such as CR39, 1.56 materials, MR series polyurethane materials, etc., the initial state is generally a viscous transparent monomer, which we call a monomer. It is usually a process of molding-casting-curing-demolding-edging that prepares the final lens from the monomers. The casting process is to fill the monomer into the cavity formed by the two glass molding pieces (e.g. glass A mold 1, and glass B mold 2) with a tape 3, as shown in FIGS. 1, 2 and 4. After the monomer is filled in the cavity, it is subjected to a thermal polymerization process and becomes a solid lens blank, which is then demolded to get lens. All the processes except casting are currently automated. Only the casting process is currently impossible to detect. To fill the monomer is 100% fully in the cavity can only be done by manual manipulation. However, resin monomers generally have irritating volatiles, odor and weak toxicity, and they can deposit on the wall of each casting workshop as a layer of sticky material. This sticky thing is volatilized the monomer can evaporate out. This substance may also enter the operator's lungs, which is much more harmful than the air pollutants such as haze. Such casting process will harm people's health and new innovations are needed to protect workers' health.

The automatic casting control of the monomer feeding is currently divided into two types: one is based on monomer level detection technology, the other is described in patent CN105848844A, which proposes a volumetric based technique. However, because the cavity volume varies from lens to lens, in practice, it is difficult to precisely control, and there is no automatic casting machine based on this technology. The monomer level detection technology is mainly based on capacitive measurement, ultrasonic measurement, laser ranging, white light interferon-Jetty, and machine vision. Unfortunately, these techniques cannot effectively perceive or control the position of the monomer level to 100% full filling during the casting process of the lens. If the monomer is not 100% fully filled, or if the monomer is overfilled, the automatic casting would then fail.

There are several special constraints during the casting process. First, the volume of the cavity of the mold to be filled by the monomer varies randomly. Second, the width of casting inlet for the aging lens is less than 1 mm. The third is that the monomer level is not flat while the level rises, as shown in FIG. 2 (arrows). Fourth, the monomer is a transparent monomer, and the refractive index is close to that of the glass mold. For example, the refractive index of CR39 is 1.499. The refractive index of the glass mold is 1.523. CR39 monomer becomes a good refractive index matching solution, which makes the interface of monomer and glass almost invisible, with reflection less than 0.01%. Even machine vision cannot tell the difference.

As such, there is no fast and reliable technique to accurately detect when the monomer is exactly 100% filled into the mold cavity. Therefore, there exists a need to prevent toxic operations, and to achieve fast and reliable automatic lens casting. Advantageously, the present invention provides a solution that can meet such need.

SUMMARY OF THE INVENTION

One aspect of the present invention provides an automatic pouring (or filling, or casting) device for a lens monomer (or an uncured liquid lens material). The device includes a filling or pouring tube for filling or pouring the lens monomer into a cavity of a round lens mold, a proportional valve connected to the pouring tube for controlling the pouring tube, a liquid level detector for detecting whether the lens monomer reaches a liquid level monitoring point P on the mold, and a timer (or a timer module in software) for recording the time period taken to pour or fill the monomer to reach said liquid level monitoring point P. When the lens monomer within the mold reaches said liquid level monitoring point P, the cavity of the round lens mold is 50% filled with the lens monomer. Preferably, the liquid level monitoring point P is not located in the center position of the round lens mold.

Another aspect of the invention provides an automatic process for pouring (or casting) a lens monomer (or an uncured liquid lens material) using the aforementioned automatic pouring device. The process includes the steps of: (1) sending a signal from the control system to the proportional valve controller to open the proportional valve and to start the filling of the cavity with the lens monomer, and in the meantime, sending a signal from the control system to the timer to start timing; (2) continuously detecting the change in light spot position and/or light intensity after said light beam transmits through the mold using the position sensor; (3) the lens monomer within the mold reaching said liquid level monitoring point, said light beam transmitting through both the mold and the lens monomer filled therein, triggering the change in the light spot position and/or the light intensity as detected to exceed a predetermined value, and the timer then recording a first time period T taken for pouring the monomer to reach said liquid level monitoring point; and (4) filling the lens monomer into the cavity for a second time period T and then stops filling, i.e. the lens monomer stops filling into the cavity when the timer value reaches 2T.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Generally, taped glass molds have a cavity. No matter the molds has an aspherical surface or not, it is used for a single-vision or cylinder lens, the volume of the cavity has different base curve or center thickness, there is a rule that the volume of the mold cavity can always be divided into two equal portions. For example, the mold cavity may be divided into two symmetrical halves by any boundary line of the geometric center of the cavity. Because casting is pouring down from the top to the bottom, the monomer level rises from the bottom up to the top. So the level and the line passing through the center of the cavity is the most reasonable and convenient. If we can accurately detect the position of this level, we can, know the time it takes for the cavity of the mold to be filled halfway. In the case where the casting flow is constant, we can accurately control the start and end time of filling by timing, thus control the monomer to be precisely 100% filled in the mold cavity.

Figure 1:
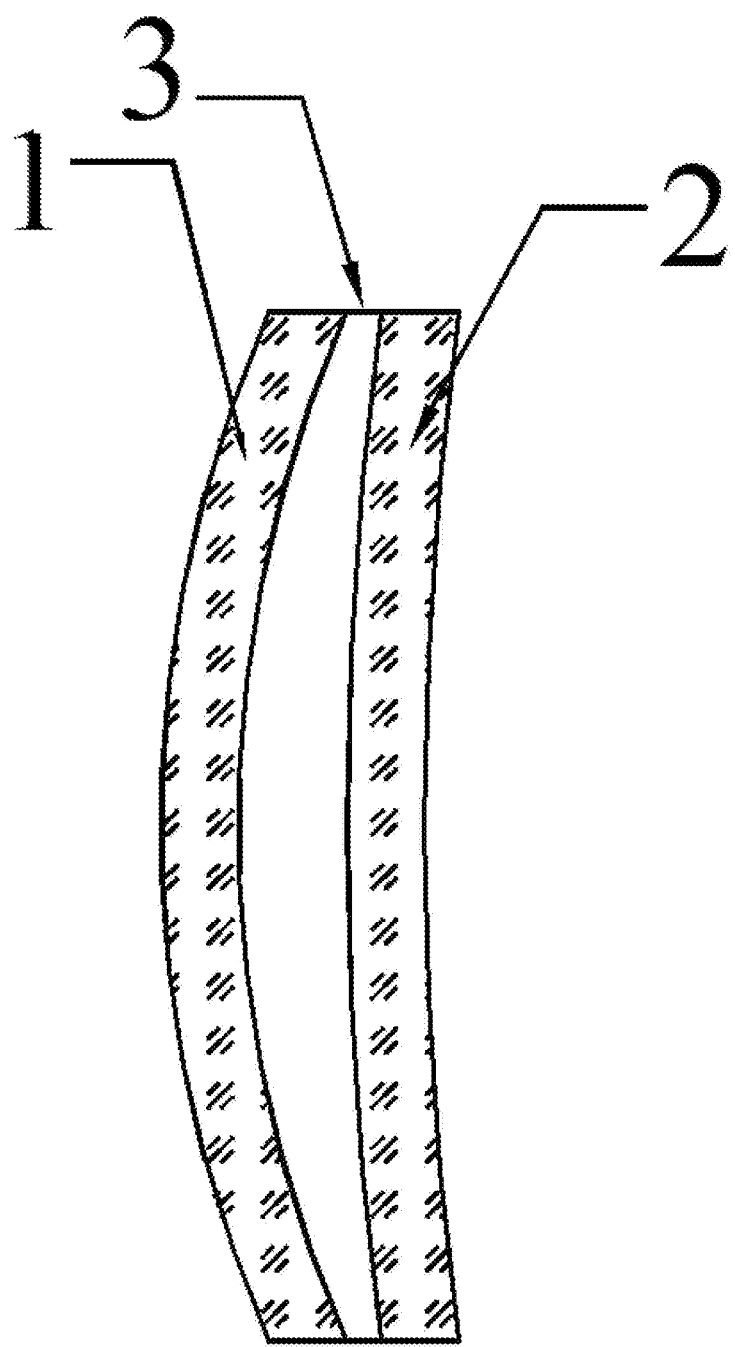
FIG. 1 schematically shows a typical taped glass mold for an aging lens.
Figure 2:
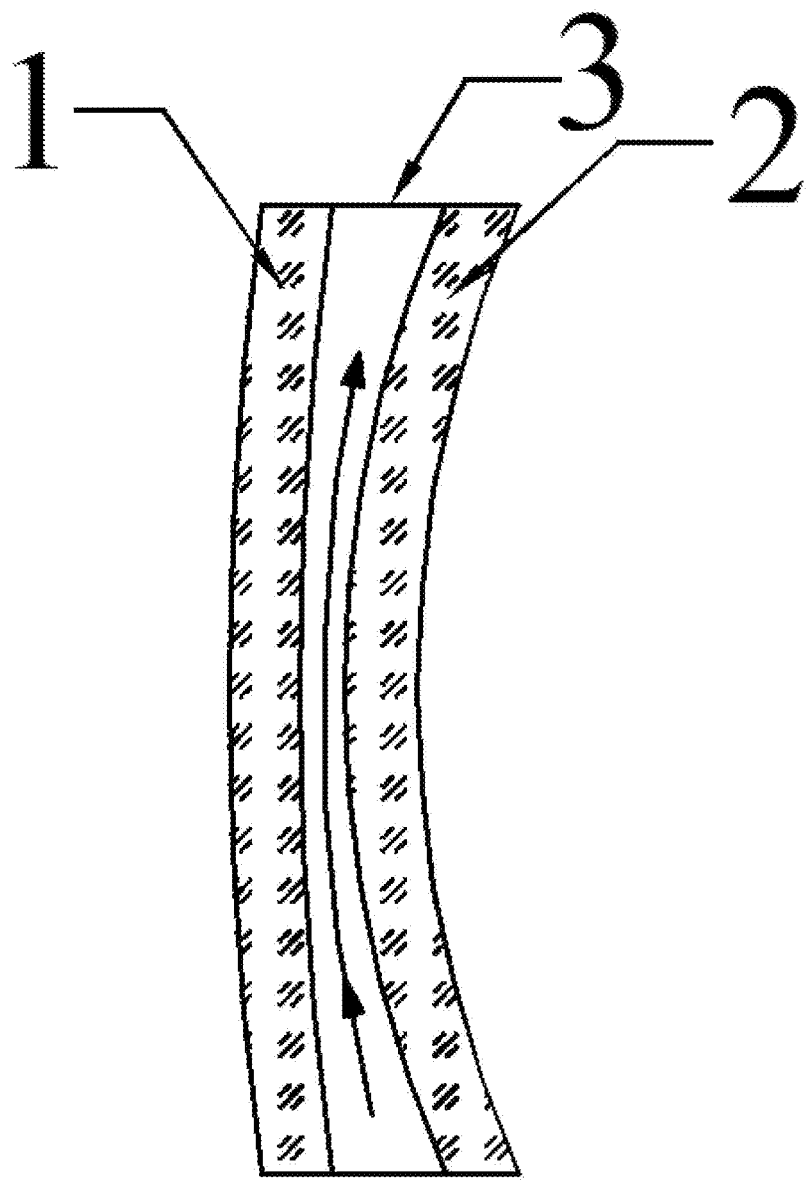
FIG. 2 shows a monomer level rising profile in a taped glass mold for a myopic lens.
Figure 3:
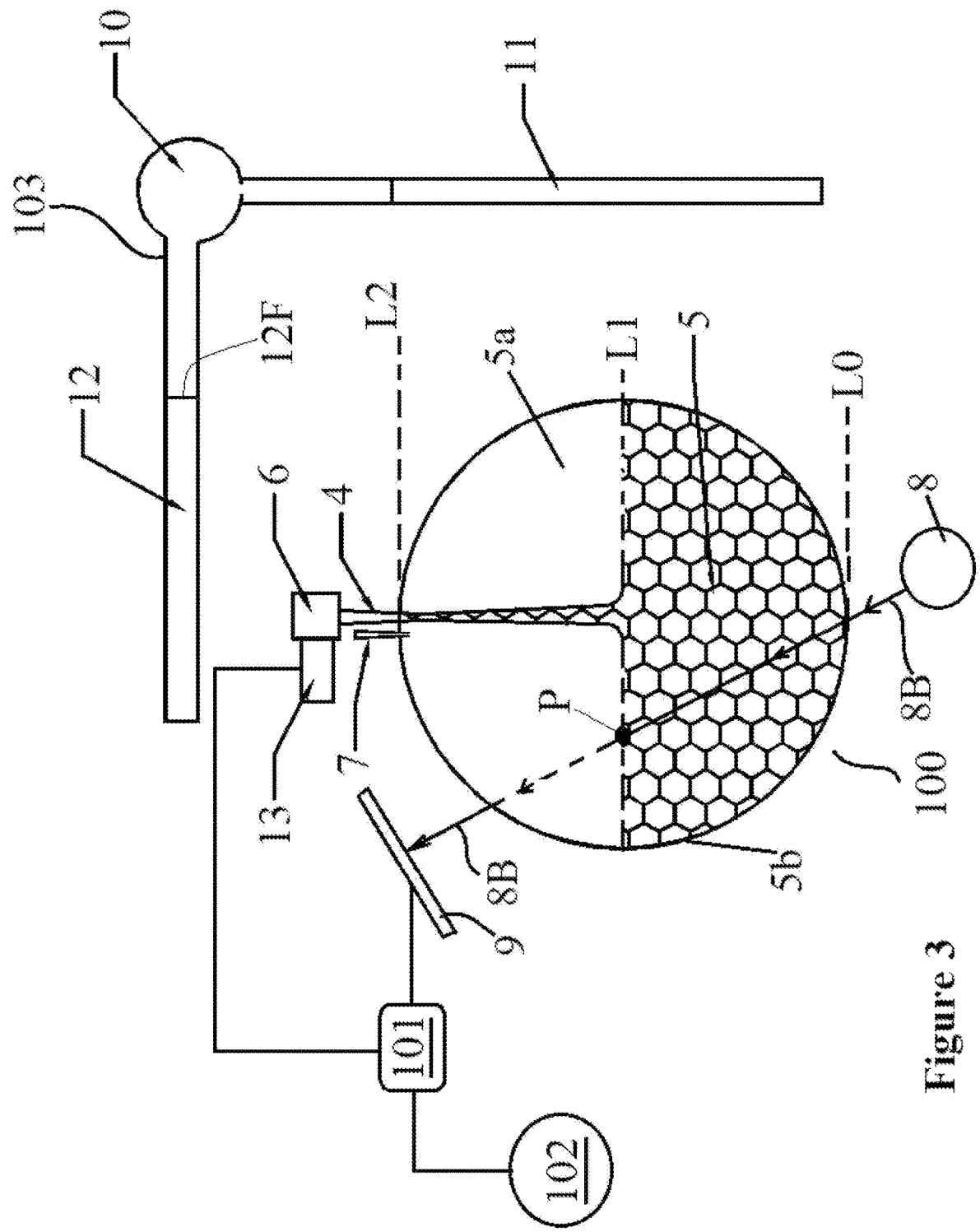
FIG. 3 schematically illustrates an automatic pouring (or filling, or casting) system for a lens monomer in accordance with an exemplary embodiment of the present invention.
Figure 4:
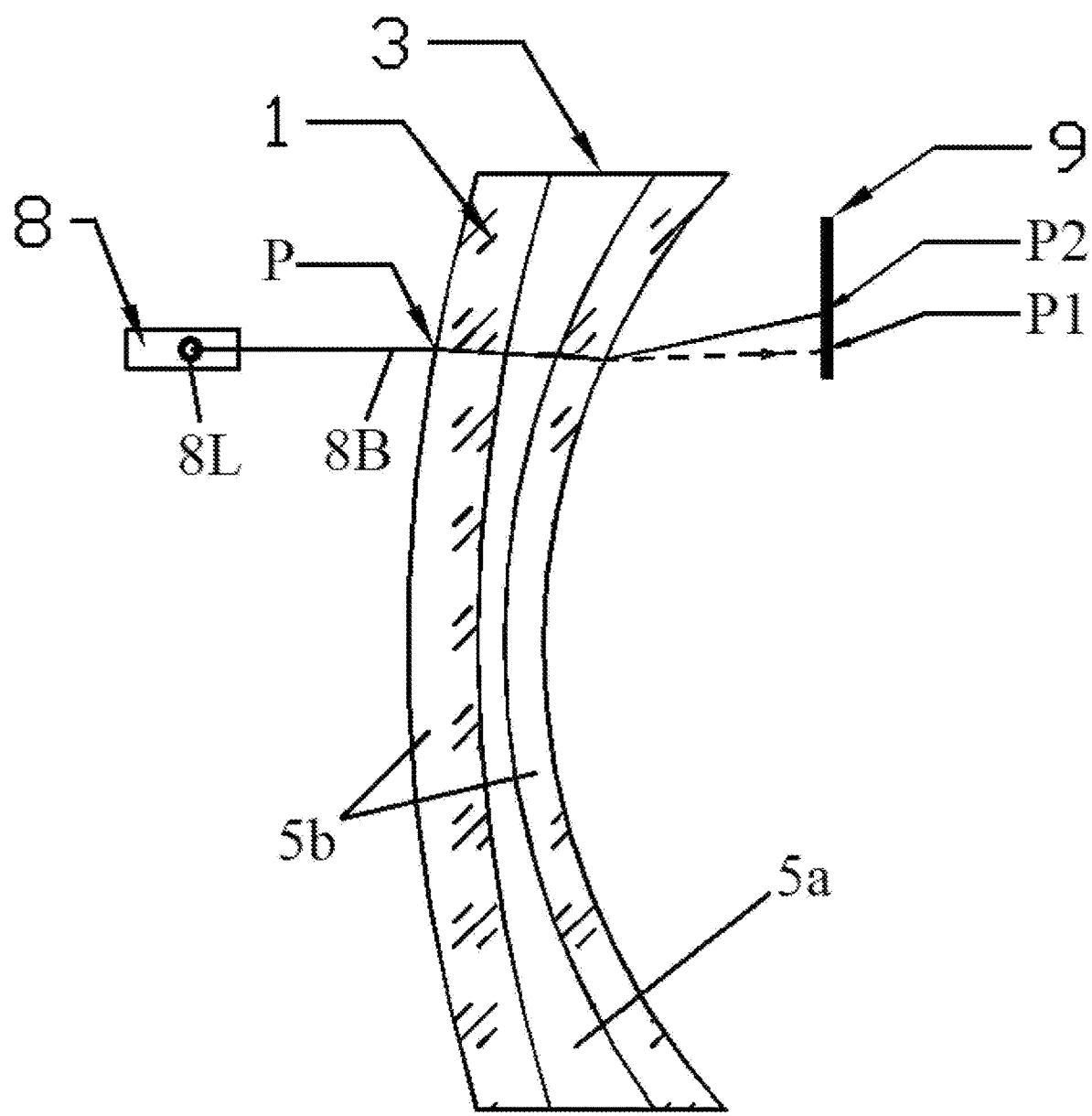
FIG. 4 demonstrates a liquid level detector for measuring or detecting the level of lens monomer within a mold in accordance with an exemplary embodiment of the present invention.

FIGS. 3 and 4 show an automatic pouring (or filling, or casting) device or system 100 for a lens monomer 5 (or an uncured liquid lens material). With reference to FIGS. 3 and 4, a filling or pouring tube 4 is used for filling or pouring the lens monomer 5 into a cavity 5a of a round lens mold 5b. A proportional valve 6 is connected to the pouring tube 4 for controlling the pouring tube 4. A liquid level detector 8 detects whether the lens monomer 5 reaches a liquid level monitoring point P on the mold 5b A timer 102 records the time period taken to pour or fill the monomer 5 to reach the liquid level monitoring point P. When the lens monomer 5 within the mold 5b reaches said liquid level monitoring point P, the cavity 5a of the round lens mold (5b) is exactly 50% filled or half filled with the lens monomer 5. Preferably, the liquid level monitoring point P is not located in the center position of the round lens mold 5b, to ensure the shift or change in light spot position (P and ΔP=P1−P2) is greater than zero, as will be described in more details.

In other words, the liquid level monitoring point P may be located at the half-value position of the whole volume of a cavity 5a of glass mold 5b and deviates from the optical center region of the cavity (namely, on the central horizontal line of the cavity deviating from the geometric center). The monitoring point of monomer level P is selected at the half full height of glass mold cavity but deviates from the optical center of the cavity (i e located the level through but deviation of the cavity from the geometric center).

With reference to FIG. 4, the liquid level detector 8 may include a light source 8L emitting, a light beam 8B that transmits through the mold 5b or (1, 2) and the lens monomer 5 filled therein (if any). A position sensor 9 detects a real-time shift or change in light spot position (P and ΔP=P1−P2) and/or light intensity (I and ΔI) after said light beam (8B) transmits through the mold 5b and the lens monomer (5) filled therein and irradiates on position sensor 9.

In various exemplary embodiments, the position sensor (9) may be selected from a PSD Sensor, a CCD camera, a CMOS camera, a four-quadrant detector, and a photoelectric array. The light source 8L may be selected from a laser, a LED, and other light sources emitting a light beam that can transmit through the mold and the lens monomer filled therein (if any) In other words, the light source 8L may be a laser, an LED light source or other collimated light source that is transmittable by the monomer.

With reference to FIG. 3, the automatic pouring device 100 may include a computer control system 101 and a proportional valve controller 13. The pouring device 100 may be configured and may work or function in a manner as described in the following. The proportional valve 6 is connected to and controlled by the proportional valve controller 13. The control system 101 is connected to and controls the proportional valve controller 13, the timer 102 and the position sensor 9. The control system 101 sends a signal to the proportional valve controller 13 to open the proportional valve 6, and to start the poring or filling of the cavity 5a with the lens monomer 5, and in the meantime, the control system 101 sends a signal to the timer 102 to start timing. At the same time, the position sensor 9 starts to continuously detect the real-time change or shift of light spot position P and/or variation of light intensity I after the light beam 8B transmits through the mold 5b. Once the lens monomer 5 within the cavity 5a raises, and reaches the liquid level monitoring point P, the light beam 8B starts to transmit through both the mold 5b (1, 2) and the lens monomer 5 filled in the cavity 5a, triggering the change in the light spot position ΔP and/or the light intensity ΔI as detected to exceed a predetermined value. The timer 102 records a first time period T (or T1) taken for pouring/filling the monomer 5 to reach the liquid level monitoring point P. Subsequently, the lens monomer 5 continues to fill into the cavity 5a for a second time period T (or T2) and then stops filling, i.e. the lens monomer 5 stops filling into the cavity 5a when the timer value reaches 2T (or T1+T2, wherein T1=T2).

Figure 5:
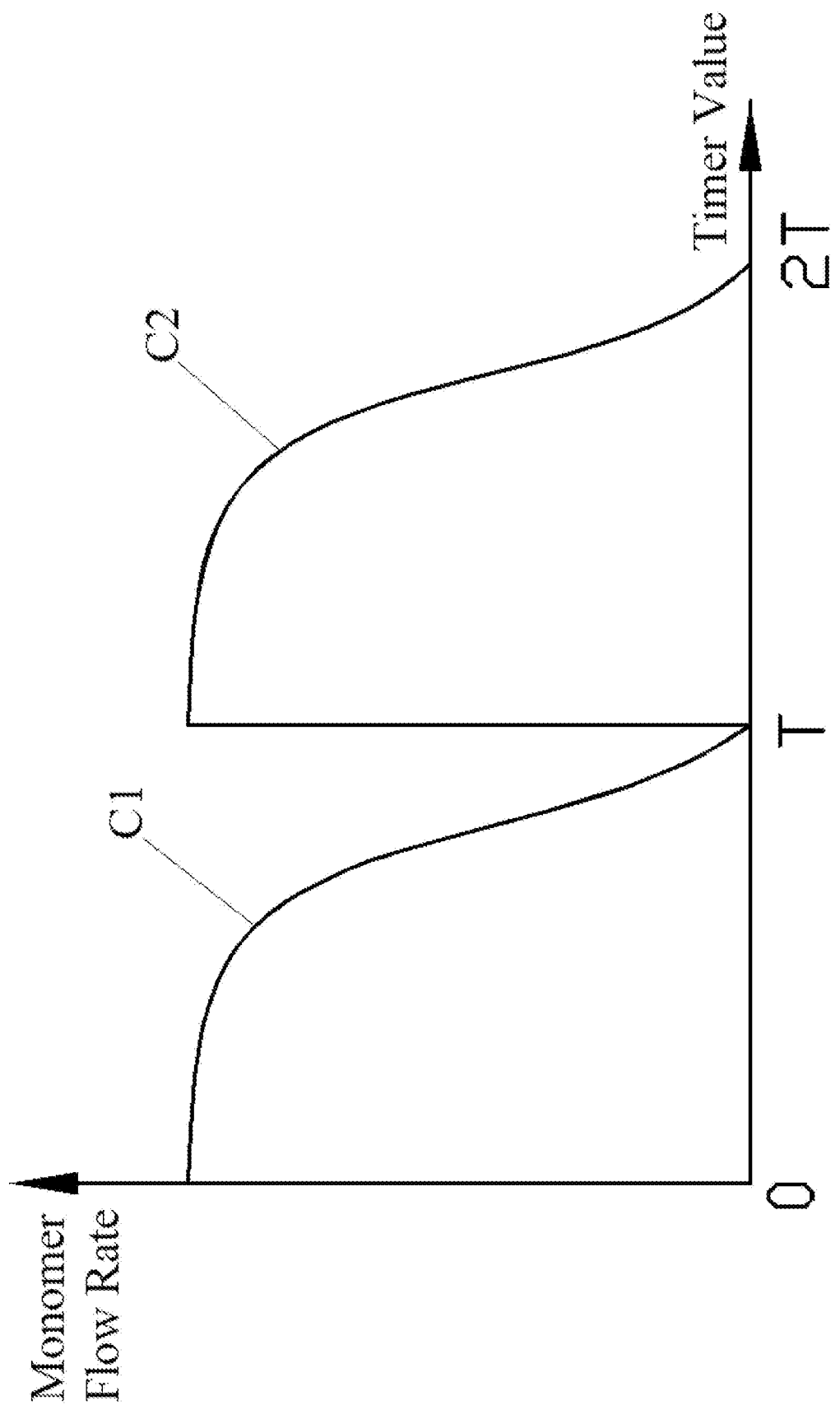
FIG. 5 depicts a flow rate pattern or curve for filling or pouring the lens monomer in accordance with an exemplary embodiment of the present invention.

In preferred embodiments as shown in FIG. 5, a flow rate pattern or curve C1 for filling or pouring the lens monomer 5 during the first time period T (or T1) is exactly the same as that C2 during the second time period T (or T2). For example, both C1 and C2 may be the same, and may include a flat curve followed by a downhill curve. In a preferred embodiment, the flow rate for filling or pouring the lens monomer 5 is reduced to a minimum when the timer value reaches T (or T1), and the flow rate for filling or pouring the lens monomer 5 is reduced to a minimum again when the timer value reaches 2T (or T1+T2).

In various embodiments, the automatic pouring device 100 may include a vacuum nozzle 7 as shown in FIG. 3 for sucking air and/or monomer vapor out from the cavity 5a when the lens monomer 5 is being filled or poured into the cavity 5a. The filling or pouring tube 4 may have a mouth of non-circular shape such as an oval shape for easy control.

Referring again to FIG. 3, the automatic process of the invention may include a purification system 103 for adsorbing and filtering volatile lens monomers 5 in the air. The purification system 103 may include a fan 10 to drive polluted air to enter an air inlet 12 with a filter 12F, and to exit through an air outlet 11. In the present invention, a purification processing is provided for a pouring workroom. A filter having activated carbon is used in a purification system, not only the volatile gases of the monomer can be purified into clean air, protecting an operator, but also the pouring workroom is provided with cleanliness, thereby improving the yield of products.

Preferably, the automatic casting device comprises a computer control system, and the proportional valve is connected with a proportional valve controller. The computer control system is connected with proportional valve controller, timer and position sensor respectively. The computer control system gives the proportional valve controller signal that controls the opening degree of the proportional valve according to FIG. 5, and starts to inject monomer into the cavity of the taped mold, in the meantime starts the timer. The position sensor constantly monitors or perceives the position and intensity of P1, and continuously collects the position of P1 and the change of light intensity, so that the detection of monomer level rise is sensitive enough. Preferably, when casting, the vacuum nozzle sucks the air in the cavity of the taped mold. When the position and intensity of P1 change to a degree (P2−P1) that exceeds a set value, the timer reading is recorded at this time T. The casting continues according to the second section of the control curve C2. Once the timer value reaches 2T, the controller turns off the proportional valve, and the cavity of taped mold is 100% filled by monomer. The casting is then terminated.

Preferably, the casting inlet of tube 4 has a circle or elliptical non-circular shape.

Referring back to FIG. 4, according to the Snell equation in geometrical optics, when a beam of light passes through a cavity where two glass molds are taped, the beam will be deflected or displaced. The deflection of the light satisfies the following equation:

$$n_i \sin \theta_i = n_r \sin \theta_r \qquad (1)$$

With this equation (1), we can perform beam or ray tracing to know where the light falls on the PSD (position sensor). For a certain taped mold, the position of the exiting light on the PSD is related to the refractive index of the medium in the cavity. When there is air in the cavity, the light beam locates at point P1. When the monomer just fills the point P as shown in FIG. 3, the exiting light beam will be at point P2. Of course, for different taped glass mold, the positions of P1 and P2 will change. But one thing is clear, when the light passes through the cavity 5a of the taped mold 5b that is change from "without monomer 5" to "with monomer 5" in the optical path, the light spot P1 will be deflected significantly toward the P2 point. This change in the position of the spot can be detected or sensed by the preferred position displacement sensor PSD, thus achieving the purpose of measuring or sensing the position of the level of filled monomer 5.

At the same time, when the light passes through the interface of two refractive indexes, if the absorption of the material is ignored, the relationship between incident light intensity Ii and refractive light intensity Ir is:

$$I_r = I_i \left(1 - \left(\frac{n_i - n_r}{n_i + n_r}\right)^2\right) \quad (2)$$

There are two interfaces in the cavity 5a of the taped mold. We assume that the refractive index of the glass mold is 1.523, the index of the monomer 5 is 1.56. When there is no monomer in the light path and we do not take account into reflection loss between the non-working surface and the air between the two-glass mold, the light intensity P1 is Ir=0.916Ii while without monomer in the optical path, and the light intensity of P2 is Ir≈Ii while with monomer in the optical path.

In other words, the presence or absence of a monomer causes about 8.5% of the change in light intensity, so this change in light intensity is also can be used as a basis for judging the monomer level.

The position sensor 9 can be any device that can sense the position of the light spot and/or the change of light intensity, such as CCD, CMOS, four-quadrant detector, PSD, etc. It can also be a photosensor array. It can be 2D or 1D. Preferred sensor is a position displacement sensor (PSD), because the PSD position sensor can simultaneously sense the change of the spot intensity and the displacement of the center of gravity. The PSD can sense spot change of the center of gravity. The offset of the point (P2–P1) has a great relationship with the angle of the incident ray, i.e. the sensitivity of the detection. We generally adjust the angle of the entire incident light to the PSD (between presence or absence of monomer) for about 2-3 mm. For example, we may choose a 10×10 mm two-dimensional PSD to serve as a position detecting unit 9. The invention utilizes the principle of light spot position and/or light intensity change when light passes through a transparent cavity to detect monomer position. In practical applications, separated position offset of the spot, the change of the light intensity, or a combination of the two, may be used to measure or detect whether there is monomer in the optical path or not.

In order to improve the measurement accuracy, we may use a beam 8B as thin as possible. In principle, any light beam is acceptable if it can pass through the monomer. However, in order to ensure that the detector has sufficient light response, we prefer collimated LD pumped laser of 532 nm light wavelength as the light beam or light source. In order to isolate the effects of ambient light, we have modulated and demodulated the light to guarantee the accuracy of detection. In order to reduce the error, the PSD and the laser source are placed on the same mount, which reduces the error caused by vibration.

The choice of location of the detection point is another key factor. This is because that if the light is along the normal to the central line, according to the above formula 1, the position of the P1 point will not change. Second, the middle area is the position where monomer droplet passes by, and the droplet will affect the inspection accuracy of the monomer level. Therefore, the monomer level point P is preferably placed at the half value of full height position L1 as shown in FIG. 3, but away the central area of the cavity. It is placed on an area of about φ50 mm, as shown in FIG. 3 at point P.

We know that position L1 or P has the largest cross section, and at the same injection flow rate, the monomer surface rises in the slowest speed. After passing this position, the cross section will become smaller and smaller. The rise of the monomer level will be faster and faster. The change at levels L0 and L2 is the fastest.

As shown in FIG. 5, in order to increase the casting speed, we control the flow rate of the casting through a proportional valve. Such a variable control may be fixed and can be adapted to all lenses. The embodiment adopts a variable flow casting mode. We quickly inject the monomer at the beginning. When it is close to the half value of full height (L1 or P), we reduce the injection speed. We slow down the injection speed when the monomer level is approaching position L1 or P, which will give the detector longer response time. In the same way, it is also possible to reduce the monomer level rising speed near the 100% filling position (L2 at time=2T).

Because of the difference in the filling amount between semi-finished blank and stock lens, caliber of the proportional valve can be 4 mm, or 2 mm.

Another benefit of using this technique is that the amount of monomer residue can be controlled to an acceptable level. When the timer 102 sends the proportional valve a signal to cut off, the residual monomer in the dropper 4 will not continue to drip under gravity.

In order to prevent residual bubbles inside the monomer, the present embodiment may employ a vacuum nozzle 7 to suck air in the cavity 5a to form a negative pressure, so that the monomer 5 is not easy to generate bubbles in rapid injection. In case it is overfilled, the monomer will be sucked away by the vacuum. Normally, vacuum nozzle is positioned at the top of taped mold 5b to make sure a 100% monomer filling.

In order to avoid deformation of the cavity 5a of the mold clamping under vacuum, the glass mold should be well clamped during the casting. Vacuum must be controlled relatively low, for example, below −10 kPa Since the monomer 5 will volatilize during the casting process, it will be inhaled into lungs, which will cause the health of the operator. At the same time, the cleanliness of the casting environment directly affects the yield of the lens. Thus, the embodiment may include an air filter 12F. Air filter may be a filter with activated carbon. The volatile monomer can be purified to a clean air to protect the operator. On the other hand, the cleanliness of the casting work room is maintained, thereby increasing the yield of the production.

Figure 6:
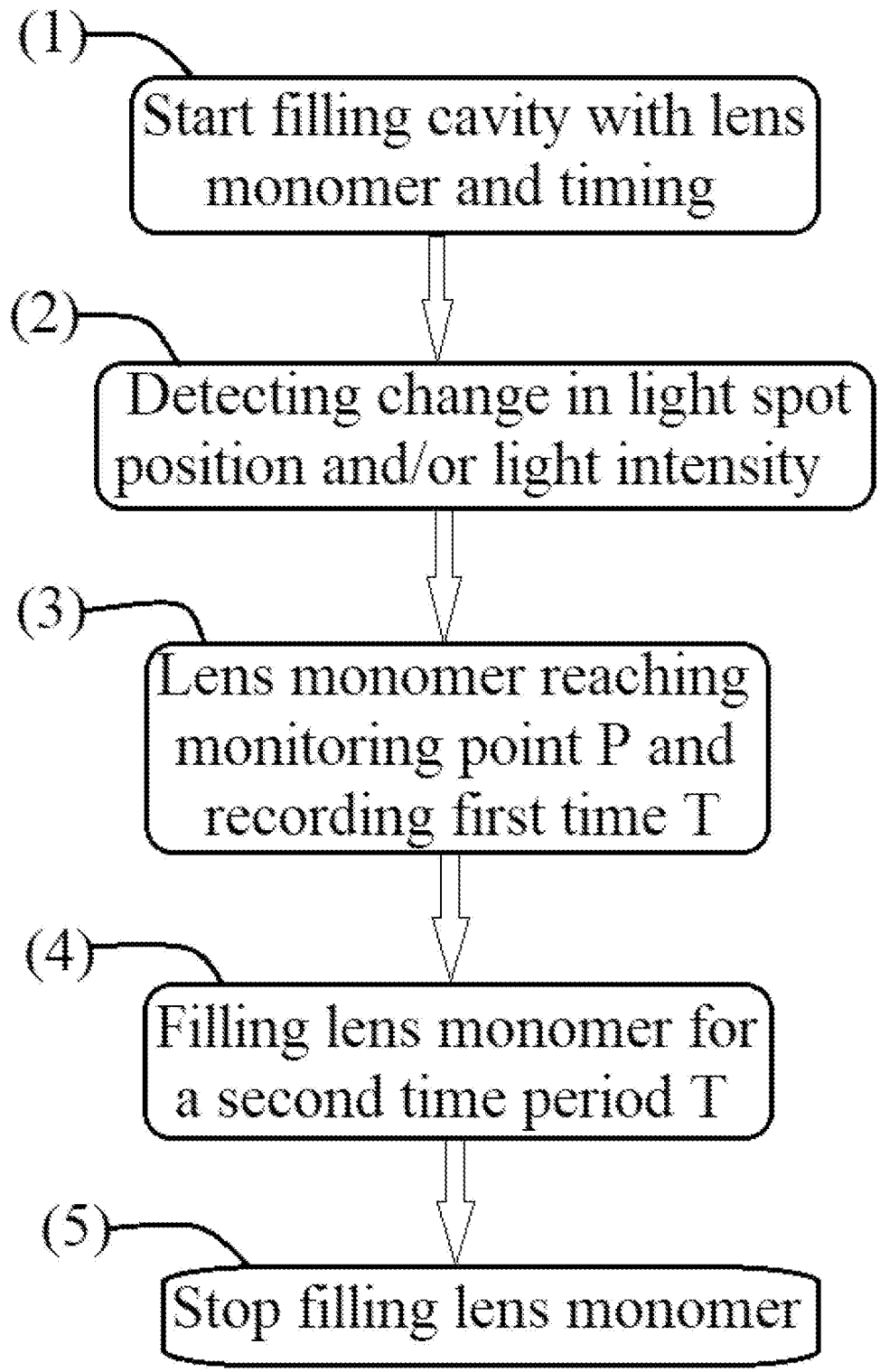
FIG. 6 is the flow chart of an automatic process for pouring (or casting) a lens monomer (or an uncured liquid lens material) in accordance with an exemplary embodiment of the present invention.

Various embodiments of the invention provide an automatic process for pouring (or casting) a lens monomer (or an uncured liquid lens material) using the automatic pouring device as described above. Referring to FIG. 6, step (1) includes sending a signal from the control system to the proportional valve controller to open the proportional valve and to start the filling of the cavity with the lens monomer, and in the meantime, sending a signal from the control system to the timer to start timing. Step 2 is continuously detecting the change in light spot position and/or light intensity after said light beam transmits through the mold using the position sensor. In Step 3, the lens monomer within the mold reaches the liquid level monitoring point, and the light beam transmits or propagates through both the mold and the lens monomer filled therein, triggering the change in the light spot position and/or the light intensity as detected to exceed a predetermined value. The timer then records a first time period T taken for pouring the monomer to reach said liquid level monitoring point. Step (4) is filling the lens monomer into the cavity for a second time period T and then stops filling, i.e. the lens monomer stops filling into the cavity when the timer value reaches 2T.

During the process a flow rate pattern C1 for filling or pouring the lens monomer during the first time period T is exactly the same as that C2 during the second time period T. For example, the flow rate patterns for filling or pouring the lens monomer during the first time period T and the second time period T are a flat curve followed by a downhill curve. In a specific embodiment, the flow rate for filling or pouring the lens monomer is reduced to a minimum when the timer value reaches T, and the flow rate for filling or pouring the lens monomer is reduced to a minimum again when the timer value reaches 2T, as shown in FIG. 5.

In an embodiment, the automatic casting method for a lens is so implemented. First, a computer control system 101 gives a proportional valve controller 13 a signal. The valve controller 13 controls the opening degree of the proportional valve 6 through the PMW signal according to the curve of FIG. 5. The proportional valve 6 starts to inject monomer 5 into the cavity 5a of the taped mold 5b In the meantime, the timer 102 starts to record time. The position sensor 9 constantly perceives the position and intensity of P1, and continuously collects the position of P1 and the change of light intensity so as to make the detection of monomer level rise sensitive enough. At the same time, the vacuum nozzle 7 continuously takes air away from the cavity 5a. When the position and intensity of P1 changes beyond a set value, the timer reading T is recorded at this time. Then, the casting is continued according to the second control curve C2, until the timer value reaches 2T. Then the controller 13 turns off the proportional valve 6 and the monomer casting ends. The flow rate of the proportional valve 6 may be minimized near two time points T and 2T, as shown in FIG. 5.

In a specific embodiment, the proportional valve controller 13 gives the proportional valve 6 a signal, and the solenoid valve opens. The system starts casting monomer 5 into cavity 5a of taped or closed mold 5b. In the meantime, the timer 102 is started to count, and the position sensor 9 is constantly sampling the position and intensity of light beam 8B, and is continuously collecting the position and intensity change of P1 at a sampling frequency of 1 kHz. During the casting, the vacuum nozzle 7 sucks air in the cavity 5a continuously. When the position and intensity of P1 change beyond a set value, the monomer has reached the half value of full height L1 or P position of the cavity. The timer 102 reading T is recorded. The casting continues according to the second control curve C2. As shown in FIG. 5, when the timer value reaches 2T, the monomer has been filled to 100% of the cavity, the controller 13 turns off proportional valve 6 to end the casting process.

Techniques and technologies in the automatic process of FIG. 6 may be described in terms of functional and/or logical block components, and with reference to symbolic representations of operations, processing tasks, and functions that may be performed by various computing components or devices. Such operations, tasks, and functions are sometimes referred to as being computer-executed, computerized, processor-executed, software-implemented, or computer-implemented. It should be appreciated that the various block components shown in the FIGS. 3, 4 and 6 (e.g. the timer or timer module 102 in FIG. 3) may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or executable instructions that, when executed by one or more processor devices, cause the host computing system to perform the various tasks. In certain embodiments, the program or code segments are stored in a tangible processor-readable medium, which may include any medium that can store or transfer information. Examples of suitable forms of non-transitory and processor-readable media include an electronic circuit, a semiconductor memory device, a ROM, a flash memory, an erasable ROM (EROM), a floppy diskette, a CD-ROM, an optical disk, a hard disk, or the like.

Through the above description of the embodiments, those skilled in the art can understand clearly that the present application may be implemented by means of software plus necessary hardware platforms, or of course, may also be implemented all by software or hardware. Based on such understanding, the entirety or a portion that the technical solutions of the present application contribute over the background art may be embodied in the form of a software product. The computer software product may be stored in storage medium, such as ROM/RAM, disk, optical disk, etc., and comprise several instructions for enabling one computer apparatus (which may be a personal computer, a server, or a network equipment, etc.) to execute the methods described in the respective embodiments or described in certain parts of the embodiments of the present application.

The flowchart and block diagrams in the Figures illustrate the architecture, functionality, and operation of possible implementations of systems, methods and computer program products according to various embodiments of the present application. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. An automatic pouring device (100) for a lens monomer (5), comprising
    a filling or pouring tube (4) for filling or pouring the lens monomer (5) into a cavity (5a) of a lens mold (5b),
    a proportional valve (6) connected to the pouring tube (4) for controlling the pouring tube (4), a liquid level detector (8) for detecting whether the lens monomer (5) reaches a liquid level monitoring point P on the mold (5*b*), and a timer or a timer module (102) for recording the time period taken to pour or fill the monomer to reach said liquid level monitoring point P;

wherein, the device (100) is so configured so that, when the lens monomer (5) within the mold (5*b*) reaches said liquid level monitoring point P, the cavity (5*a*) of a round lens mold (5*b*) is 50% filled with the lens monomer (5);

wherein the liquid level detector (8) comprises a light source (8L) emitting a light beam (8B) that transmits through the mold (5*b*) and the lens monomer (5) filled therein, and a position sensor (9) that can detect a real-time change in light spot position and/or light intensity after said light beam (8B) transmits through the mold (5*b*) and the lens monomer (5) filled therein;

wherein the automatic pouring device further comprises a control system (101) and a proportional value controller (13); and wherein the pouring device (100) is so configured that (i) the proportional valve (6) is connected to and controlled by the proportional valve controller (13); (ii) the control system (101) is connected to and controls the proportional valve controller (13), the timer (102) and the position sensor (9); (iii) the control system (101) sends a signal to the proportional valve controller (13) to open the proportional valve (6) and to start the poring or filling of the cavity (5*a*) with the lens monomer (5), and in the meantime, the control system (101) sends a signal to the timer (102) to start timing, (iv) at the same time the position sensor (9) starts to continuously detect the real-time change in light spot position P and/or light intensity I after said light beam 8B transmits through the mold (5*b*); (v) once the lens monomer (5) within the cavity (5*a*) raises and reaches said liquid level monitoring point P, said light bean 8B starts to transmit through both the mold (5*b*) and the lens monomer (5) filled in the cavity (5*a*), triggering the change in the light spot position ΔP and/or the light intensity ΔI as detected to exceed a predetermined value, and the timer (102) records a first time period T1 taken for pouring/filling the monomer (5) to reach said liquid level monitoring point P; and (vi) the lens monomer (5) continues to fill into the cavity (5*a*) for a second time period T2 and then stops filling such that the lens monomer (5) stops filling into the cavity (5*a*) when the timer value reaches T1+T2, wherein T1=T2.

2. The automatic pouring device according to claim 1, wherein the position sensor (9) is selected from a PSD Sensor, a CCD camera, a CMOS camera, a four-quadrant detector, and a photoelectric array.

3. The automatic pouring device according to claim 1, wherein the light source (8L) is selected from a laser and a LED emitting a light beam that can transmit through the mold and the lens monomer filled therein.

4. The automatic pouring device according to claim 1, which is so configured that a flow rate pattern or curve for filling or pouring the lens monomer (5) during the first time period T1 is exactly the same as that during the second time period T2.

5. The automatic pouring device according to claim 4, wherein the flow rate patterns or curves for filling or pouring the lens monomer (5) during the first time period T1 and the second time period T2 are a flat curve followed by a downhill curve.

6. The automatic pouring device according to claim 4, wherein the flow rate for filling or pouring the lens monomer (5) is reduced to a minimum when the timer value reaches T1 and the flow rate for filling or pouring the lens monomer (5) is reduced to a minimum again when the timer value reaches T1+T2.

7. The automatic pouring device according to claim 1, further comprising a vacuum nozzle (7) for sucking air out from the cavity (5*a*) when the lens monomer (5) is filling or pouring into the cavity.

8. The automatic pouring device according to claim 1, wherein the filling or pouring tube (4) has a mouth or outlet of non-circular shape.

9. The automatic poring device according to claim 1, further comprising a purification system (103) for adsorbing and filtering volatile lens monomers (5) in the air.

10. The automatic poring device according to claim 1, wherein the lens mold (5*b*) is round, and wherein the liquid level monitoring point P is not located in the center position of the round lens mold (5*b*).

11. An automatic process for pouring a lens monomer using the automatic pouring device according to claim 1, comprising:
  (1) sending a signal from the control system to the proportional valve controller to open the proportional valve and to start the filling of the cavity with the lens monomer, and in the meantime, sending a signal from the control system to the timer to start timing;
  (2) continuously detecting the change in light spot position and/or light intensity after said light beam transmits through the mold using the position sensor;
  (3) the lens monomer within the mold reaching said liquid level monitoring point, said light beam transmitting through both the mold and the lens monomer filled therein, triggering the change in the light spot position and/or the light intensity as detected to exceed a predetermined value, and the timer then recording a first time period T taken for pouring the monomer to reach said liquid level monitoring point; and
  (4) filling the lens monomer into the cavity for a second time period T and then stops filling, i.e. the lens monomer stops filling into the cavity when the timer value reaches 2T.

12. The automatic process according to claim 11, wherein the flow rate patterns for filling or pouring the lens monomer during the first time period T and the second time period T are a flat curve followed by a downhill curve.

13. The automatic process according to claim 11, wherein the flow rate for filling or pouring the lens monomer is reduced to a minimum when the timer value reaches T, and the flow rate for filling or pouring the lens monomer is reduced to a minimum again when the timer value reaches 2T.

* * * * *